United States Patent [19]

Miyakawa et al.

[11] Patent Number: 4,974,098
[45] Date of Patent: Nov. 27, 1990

[54] ORIGINAL TABLE FOR READING IMAGES

[75] Inventors: Tadashi Miyakawa, Kaisei; Masahiro Inoda; Kunio Iba, both of Tokyo, all of Japan

[73] Assignee: Fuji Photo Film Co., Ltd., Kanagawa, Japan

[21] Appl. No.: 236,961

[22] Filed: Aug. 26, 1988

[30] Foreign Application Priority Data

Aug. 26, 1987 [JP] Japan .................................. 62-212344
Aug. 26, 1987 [JP] Japan .................................. 62-212345

[51] Int. Cl.$^5$ ............................................. H04H 1/00
[52] U.S. Cl. ..................................... 358/406; 358/461; 358/464
[58] Field of Search ...................... 358/406, 464, 461; 250/578

[56] References Cited

U.S. PATENT DOCUMENTS 4,554,583 11/1988 Saitoh et al. ........................ 358/461
4,806,780 2/1989 Yamamoto et al. ................. 358/461
4,841,376 6/1989 Yamamoto et al. ................. 358/461

Primary Examiner—Edward L. Coles, Sr.
Attorney, Agent, or Firm—Sughrue, Mion, Zinn, Macpeak & Seas

[57] ABSTRACT

According to this invention, since black regions are provided along the advancing direction on an original plate, the dark-time output levels of the linear sensor would not be affected by dust adhered on the original plate or the presence of trimming lines. Since a calibration region is provided, the circuit system can be calibrated with the maximum and minimum values of the signals from the linear sensor to thereby achieve more precise reading of images.

19 Claims, 4 Drawing Sheets

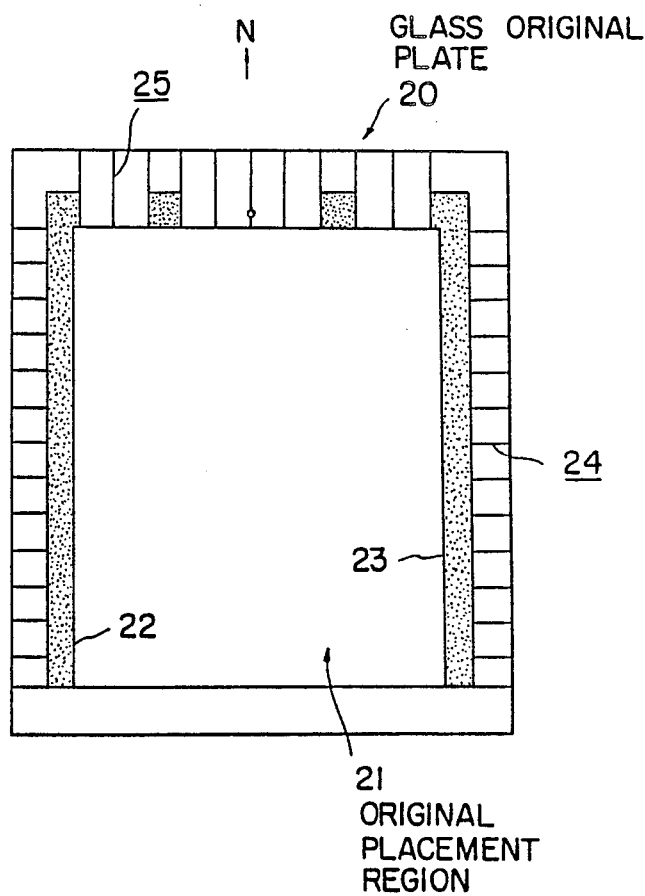
F I G. 4

ORIGINAL TABLE FOR READING IMAGES

BACKGROUND OF THE INVENTION

This invention relates to the structure of an original table for reading images to be used when the images are read with a linear sensor (one dimensional sensor) comprising a photo-electronic conversion element such devices as a CCD (charge coupled device).

Image reading devices which read originals with linear sensors have widely been utilized. As FIG. 1 schematically shows, an original 1 on an original table is moved in a direction N at a predetermined timing, and at the same time the images are being read in the unit of a linear region 1A with a linear sensor 10 comprising CCD or MOS (metal oxide semiconductor) via a fixed lens system 2. The one line of data is converted into electric signals, and processed for images. The images are thus read by scanning the whole original 1 while the original 1 is being transported in the direction N.

FIG. 2 shows a positional relation of the linear sensor 10 in cross section wherein the original 1 is placed on a transparent glass plate 3 constituting an original table, and is covered with another transparent glass plate 4. The original 1 is illuminated with light from a light source 5 such as a fluorescent lamp, and the light transmitted through the original 1 of light transparent type such as a sheet of negative film enters the linear sensor 10 via the lens system 2. As shown in FIG. 3, the glass plate 3 is provided with an original placement region 32 for mounting the original 1 and with trimming lines 31 at a predetermined interval on both sides and at the top of the glass plate 3 to be used as the reference in registering the original 1 precisely on the original table. The image reading region 1A of the linear sensor 10 is wider than the original placement region 32 to give sufficient margins so that the linear sensor 10 can read the regions inside the trimming lines 31 on both sides. The linear sensor 10 has an effective output region 11 at the center thereof and dark-time output regions 12 and 13 comprising several pixels on both sides thereof which are respectively structured with light-blocking members coated over light receiving surfaces. The outputs from the dark-time output regions 12 and 13 are signals outputted when the light is blocked corresponding to image signals read at the effective output regions 11 of the linear sensor 10 to provide reference signals and to substract the reference signals of the dark-time level from the image signals of the effective output region 11 to thereby output image signals corrected with the dark-time level.

In the conventional image reading method with such a linear sensor 10, the image reading region 1A of the linear sensor 10 is wider than the region 32 of the glass plate 3 as shown in FIG. 3, and the lens system 2 is adjusted as to position the dark-time output regions 12 and 13 at locations falling outside the placement region 32, or on the trimming lines 31. When the original table is moved in the direction N for scanning of the image reading, the dark-time output regions 12 and 13 of the linear sensor 10 unavoidably detect the trimming lines 31 outside the imaged region which do not transmit the light in the case shown in FIG. 2 while they detect the transparent regions of the glass plate 3 where the trimming lines 31 are not provided on the light transmitting regions in other cases. The dark-time output regions 12 and 13 pass the light transmitting region and non-transmitting region alternately to thereby inconveniently cause minor fluctuations in the output level. Processing of image signals read by the effective output region 11 is thus affected disadvantageously to thereby deteriorate the image quality. This is attributable to the fact that as the light blocking members coated on the light receiving surfaces of the dark-time output regions 12 and 13 have transmissivity of 1% or less, the changes in input light causes minute fluctuations in the output level.

If the glass plate 3 is not coated with the trimming lines 31, dust and scars on the glass plate tend to damage the surfaces and cause similar problems in the output from the dark-time output regions 12 and 13 as the input light changes.

Moreover, in the prior art, as the signals from the linear sensor 10 are digitalized by an A/D converter for image processing, it is necessary to measure maximum and minimum light intensities inputted in the linear sensor 10 in advance for calibrating the circuit system for signal processing. This is because if the maximum and minimum input light intensities are correctly known in advance, the system can precisely and securely read the most and least lit parts of any original.

The maximum input light intensity in the prior art is given as the light transmitting through the original table with the light source 5 turned on while the minimum input light is given as the light with the light source 5 turned off when there is no original 1 on the table. However, the operation to turn the light source 5 on and off is quite cumbersome, and the life of the light source 5 presents another problem. It also takes a long time for calibrating the circuit system.

SUMMARY OF THE INVENTION

This invention was contrived to eliminate aforementioned problems encountered in the prior art and an object of this invention is to provide an original table for reading images which can read images in high quality by preventing the signals in the dark-time output regions of the linear sensor from fluctuating due to the trimming lines on the original plate or dust adhered thereon.

Another object of this invention is to provide an original table for reading images which can read images immediately after calibrating the circuit system by arranging a calibration region on the original plate which can easily obtain the maximum and minimum light intensities simply using one scan of the linear sensor prior to reading the original on the plate.

According to one aspect of this invention, for achieving the objects described above, there is provided an original table for reading images of the type wherein an original placed on an original plate is illuminated with light and said original is read by a linear sensor while said original plate is relatively moved, which is characterized in that black regions are provided at a forefront of said original plate in an advancing direction corresponding to pixel regions for dark-time output provided on said linear sensor at an edge.

According to another aspect of this invention, there is provided an original table for reading images of the type wherein an original placed on an original placement region of an original plate is illuminated with light and said original is read by a linear sensor as said original plate is relatively moved, which is characterized in that a calibration region which defined a maximum and a minimum intensities of an incident light in said linear sensor is provided at a forefront of said original placement region in an advancing direction.

The nature, principle and utility of the invention will become more apparent from the following detailed description when read in conjunction with the accompanying drawings.

BRIEF DESCRIPTION OF THE DRAWINGS

In the accompanying drawings:

FIG. 4 is a schematic view to show an embodiment of this invention;

PREFERRED EMBODIMENTS OF THE INVENTION

Figure 1:
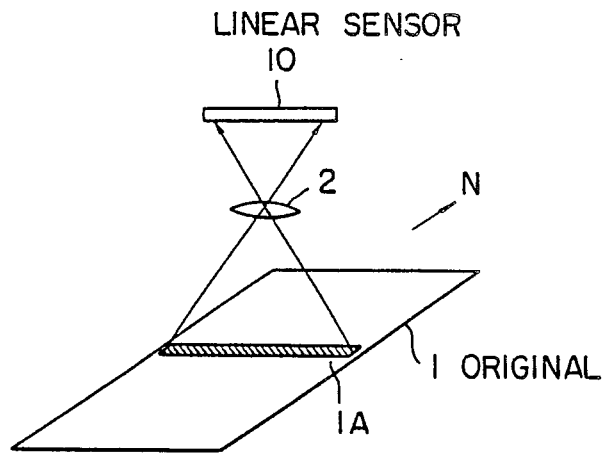
FIG. 1 is a perspective view to explain the state for reading an original with a linear sensor.

FIG. 4 schematically illustrates a glas original plate 20 (glass plate 3 in FIG. 2) according to this invention. In this figure, strips of black regions 22 and 23 of non-light-transparent type are provided in the direction N on both sides of the original placement region 21 by vapor-deposition of metal, printing or by means of tapes pasted thereon. Trimming lines 24 are provided at a predetermined interval outside the black regions 22 and 23 for trimming the original. Such trimming lines 25 are also provided on the top side of the original placement region 21 at a predetermined interval.

By providing the two strips of the black regions 22 and 23 on both sides of the original placement region 21, the light from the black regions 22 and 23 constantly enters the dark-time output regions 12 and 13 of the linear sensor 10 respectively when the linear sensor 10 is reading an original placed on the glass original plate 20. This can prevent input light from fluctuating due to the trimming lines 24, adhered dust or the like. This also stabilizes the dark-time level of the dark-time output regions 12 and 13. Since the dark-time output level does not fluctuate, the image signals can be stably processed for the effective output region 10 of the linear sensor 10.

Figure 2:
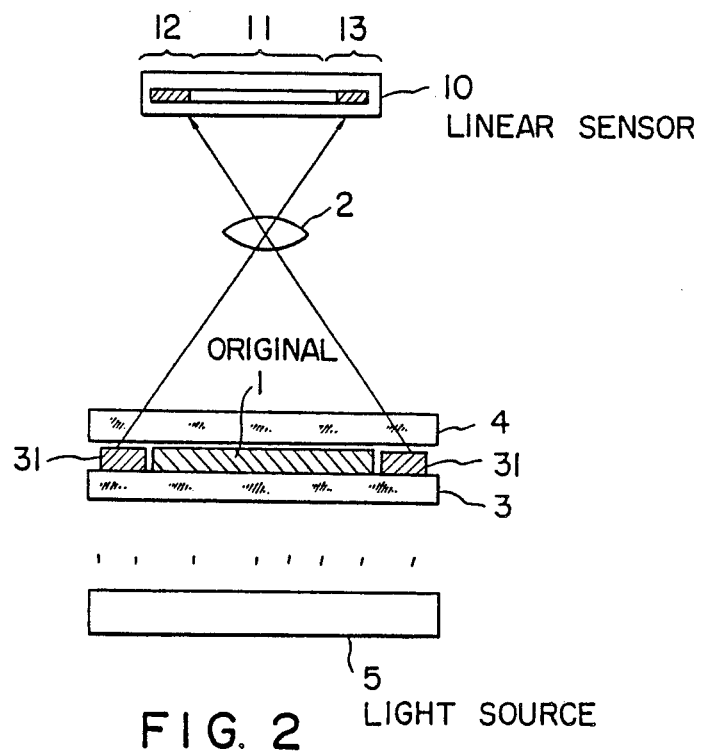
FIG. 2 is a cross sectional view thereof.
Figure 3:
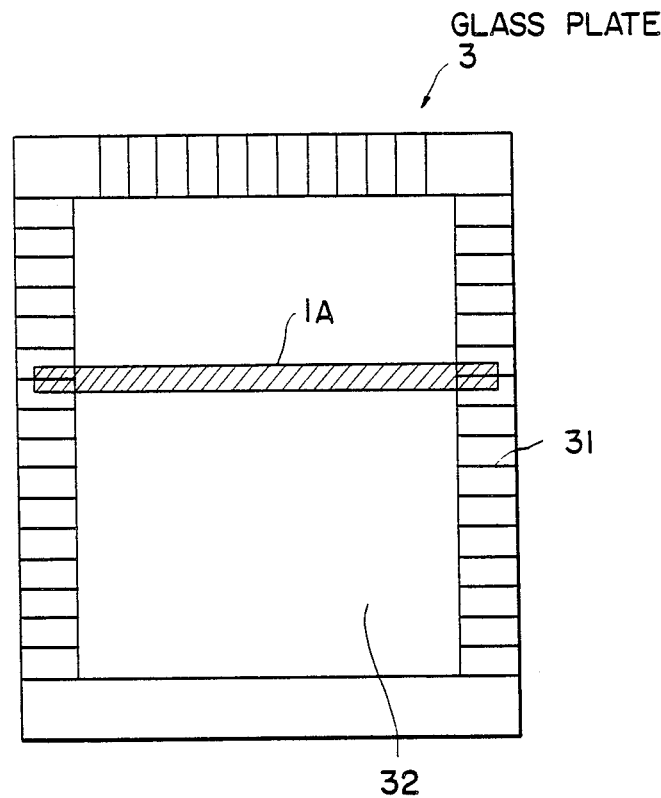
FIG. 3 is a view to show an example of the prior art original plate.

The black regions 22 and 23 may be formed by vapor-depositing metals such as chrome on a glass plate surface, by pasting black tapes, or by printing. If the dark-time output region of the linear sensor 10 is provided only on one side, the black region may be provided only on one corresponding side. If the original is of light transparent type such as a negative film, it is illuminated with the light coming from a light source provided below as shown in FIG. 2 so that the light transmitted therethrough may be read by the linear sensor. Even if the original is of non-light-transparent type such as a printed document, it may be read by the linear sensor by illuminating the document with the light from a light source of reflecting type and reading the light reflected therefrom. Although the linear sensor is fixed and the original is moved for scanning in the above embodiment, the same effect may be achieved by fixing the original while the linear sensor is moved in relation to the original. The material for the original plate is not limited to glass.

As described in detail in the foregoing, since the original table according to this invention has the black regions corresponding to the dark-time output regions along the moving direction on the original plate, it is possible to usually and stably read the images without the changing of the dark-time output level due to the trimming lines, adhered dust or the like.

Figure 5:
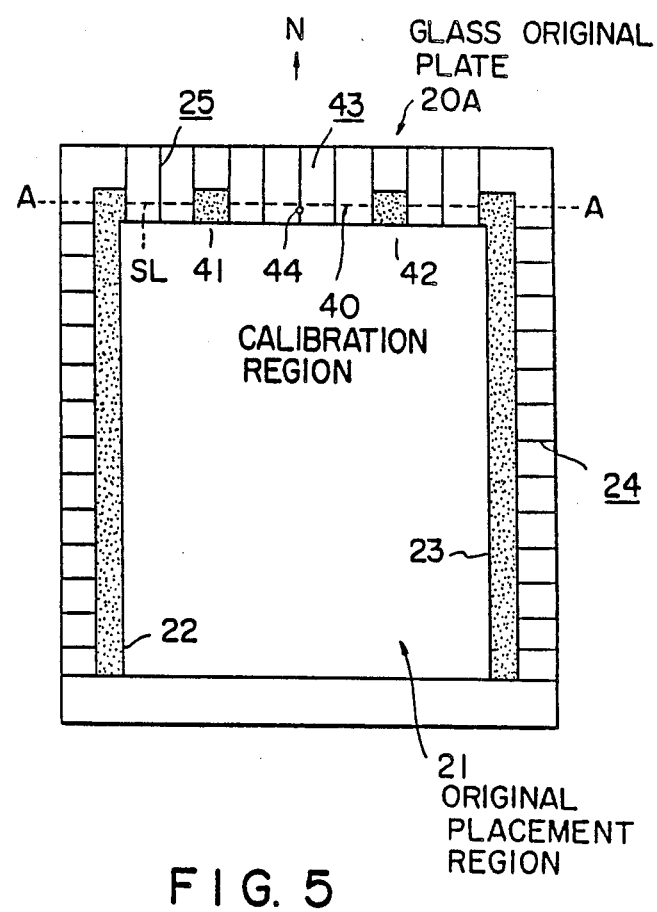
FIG. 5 shows another embodiment of an original plate according to this invention.

FIG. 5 schematically shows another embodiment of a glass original plate 20A according to this invention wherein a calibration region 40 is provided at a forefront of the original placement region 21 in the moving direction N. In the calibration region 40 are formed a transparent region 43 of the glass original plate 20A, opaque regions 41 and 42 made by laminating rectangular opaque members such as a metal piece on the glass original plate 20A, the trimming lines 25 at a predetermined interval similar to the above, and the black regions 22 and 23 of non-light-transparent type in stripes.

The size of the opaque regions 41 and 42 is preferably 10 mm square or larger in order to avoid the effect of flare in the linear sensor 10. A circular mark 44 is marked on one of the trimming lines 25 for spot reading of the density of the original placed on the original placement region 21, in which case a desired part of the original is registered at the mark 44 when the density of the images thereon should be measured. The shape and the number of the opaque regions 41 and 42 may be determined arbitrarily so far as both transparent and opaque regions are present on a line.

Figure 6A:
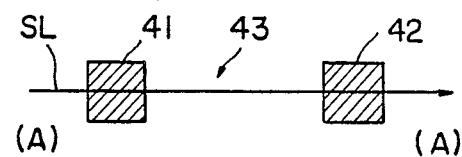
FIGS. 6A and 6B are explanatory views for the operation thereof.
Figure 6B:
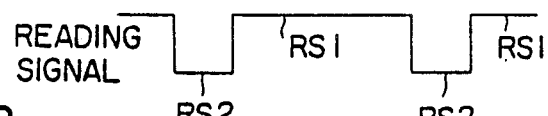

As stated above, since there is provided a calibration region 40 comprising the transparent region 43 and the opaque regions 41 and 42 in front of the original or the upper part of the original placement region 21, and the linear sensor 10 is adapted to read to images of the reading region 1A in lines as well as vertically to the moving direction of the original table as shown in FIG. 2, the linear sensor 10 can measure both the transparent region 43 and the opaque regions 41 and 42 simultaneously with the light source turned on using only one scanning SL of the calibation region 40 prior to reading the original placed on the original placement region 21 as shown by a dotted line A-A in FIG. 5. Since the line sensor 10 reads the light intensity on the calibration region 40 in the positional relation shown in FIG. 6A, the linear sensor 10 can output the reading signal RS1 of the maximum light intensity corresponding to the transparent region 43 as shown in FIG. 6B as well as the reading signal RS2 of the minimum light intensity corresponding to the opaque regions 41 and 42. The circuit system can thereby the calibration.

The black regions 22 and 23 are provided in strip form on both sides of the original placement region 21 according to this invention original table. When the linear sensor 10 reads the original placed on the glass original plate 20, since the light from the black regions 22 and 23 are constantly inputted into the respective dark-time output regions 12 and 13, the input light level will not fluctuate by the presence of the trimming lines 24, adhered dust or the like, and the dark-time levels of the dark-time output regions 12 and 13 will not fluctuate. Since the level of the dark-time output does not fluctuate, the image signals processing for the effective output region 11 by the linear sensor 10 can be conducted stably.

According to this invention original table, as mentioned above, since the original table is provided with a calibration region, the maximum and minimum intensities of the incident light in the linear sensor can be measured before reading the images. This enables calibration of the circuit system with the maximum and minimum intensities of the reading signals to thereby secure precise reading of the images in the subsequent process.

It should be understood that many modifications and adaptations of the invention will become apparent to those skilled in the art and it is intended to encompass such obvious modifications and changes in the scope of the claims appended hereto.

What is claimed is:

1. An original table for receiving and original to be illuminated with light and read by a linear sensor receiving light from the original as said original table and linear sensor are moved relative to one another in a scanning direction N, said linear sensor having an image reading region consisting of an effective output region and dark-time output regions on both sides of the effective output region, said original table having an original placement region and margin regions outside said original placement region, said original table comprising:

continuous black regions in the margin regions extending in the scanning direction N such that when said linear sensor and original table are moved relative to one another for reading an original, said dark-time output regions will be in registration with said continuous black regions.

2. An original table as claimed in claim 1, wherein said original table comprises a transparent glass plate with trimming lines in at least one of said margin regions.

3. An original table as claimed in claim 2, wherein said margin regions are located along the sides of the original table extending in the scanning direction N and along a side transverse to the scanning direction N, and further including at least one black region situated in and shorter than said transverse side.

4. An original table as claimed in claim 3, further including a plurality of spaced black regions situated in and each substantially shorter than said transverse side.

5. An original table as claimed in claim 4, wherein said transverse side is at the front of said original table relative to a scan in said scanning direction N.

6. An original table as claimed in claim 1, wherein said continuous black regions are opaque tapes on said original table.

7. An original table as claimed in claim 1, wherein said continuous black regions are vapor-deposited metal on said original table.

8. An original table as claimed in claim 1, wherein said continuous black regions are printed regions on said original table.

9. An original table as claimed in claim 4, wherein said spaced black regions are opaque tapes on said original table.

10. An original table as claimed in claim 4, wherein said spaced black regions are vapor deposited metal on said original table.

11. An original table as claimed in claim 4, wherein said spaced black regions are printed regions on said original table.

12. An original table for receiving an original to be illuminated with light and read by a linear sensor receiving light from the original as said original table and linear sensor are moved relative to one another in a scanning direction N, said linear sensor having an image reading region consisting of an effective output region and dark-time output regions on both sides of the effective output region, said original table having an original placement region and margin regions outside said original placement region, said original table comprising:

at least one black region in a margin region extending transverse to the scanning direction N, said black region being substantially shorter than the length of said transverse margin region, a portion of said transverse margin region which includes said at least one black region defining a calibration region for defining maximum and minimum intensitites of light from said original table to said linear sensor.

13. An original table as claimed in claim 12, wherein said calibration region comprises transparent regions and said at least one black region, said maximum intensity corresponding to said transparent region and said minimum intensity to said at least one black region whereby said linear sensor can be calibrated with a single can of said calibration region in a direction transverse to said scanning direction N.

14. An original table as claimed in claim 13, further including a plurality of spaced black regions in said calibration region.

15. An original table as claimed in claim 14, wherein said transverse margin region is at the front of said original table relative to a scan in said scanning direction N.

16. An original table as claimed in claim 14, wherein said plurality of spaced black regions are opaque tapes on said original table.

17. An original table as claimed in claim 14, wherein said plurality of spaced black regions are vapor-deposited metal on said original table.

18. An original table as claimed in claim 14, wherein said plurality of spaced black regions are printed regions on said original table.

19. An original table as claimed in claim 14, wherein each of said spaced black regions is rectangular shaped, of at least 10 mm squares.

* * * * *